UNITED STATES PATENT OFFICE.

GEORG SCHNEIDER, OF LAUENSTEIN, GERMANY, ASSIGNOR TO OSCAR KRAUTH, OF CHARLOTTENBURG, PRUSSIA, GERMANY.

PROCESS FOR THE RECOVERY OF COPPER FROM PORPHYRY ORES AND THE LIKE.

986,508.  Specification of Letters Patent.  Patented Mar. 14, 1911.

No Drawing.  Application filed April 21, 1910. Serial No. 556,894.

*To all whom it may concern:*

Be it known that I, GEORG SCHNEIDER, a citizen of Saxony, residing at Lauenstein, in the Kingdom of Saxony, Germany, have invented new and useful Improvements in Processes for the Recovery of Copper from Porphyry Ores and the Like, of which the following is a specification.

Copper sulfid ores naturally rich in copper or enriched by concentration are nearly exclusively worked up by the smelting process. Low grade copper ores containing free copper sulfid if they are not suitable for concentration and the smelting process, are worked up by a wet process, either by lixiviation with iron chlorids (Stadtberge process) or iron sulfates (Rio Tinto). The roasted pyrites containing small quantities of copper, as produced in the manufacture of sulfuric acid, are roasted with sodium chlorid, lixiviated and afterward treated with metallic iron for precipitating the copper in solution. Other methods for extracting copper from low grade ores have not proved profitable. Those processes are well known and have been worked in practice for a long time. Up to the present the process consisting in the chlorination of copper by roasting the ore with alkali chlorids and the extraction of copper with weak hydrochloric acid followed by the precipitation of the copper by means of metallic iron has only been applied for the treatment of roasted copper bearing pyrites but not for the extraction of copper from crude sulfid ores such as porphyry ores. There was a general opinion that such process could only be applied with profit to roasted copper bearing pyrites, the previous formation of iron sulfate and the presence of iron monosulfid being considered an absolute necessity for the formation of cupric chlorid (see Schanbel, *Handbook of Metallurgy* II. edition, volume I, page 311).

Experiments with a view to simplifying and cheapening the working up of porphyry ores or similar low grade copper ores proved that contrary to the statements in metallurgical handbooks the chlorination process could be worked with profit with those ores without their undergoing a previous roasting. Porphyry ores are found principally in Utah and Nevada and may be described as ores containing from 1 to 3% of copper as copper sulfid which is disseminated in a porphyric matrix. It was found in practice that if for example a porphyry ore containing 2.34% copper and 2.36% sulfur after breaking up be mixed with say 10% of sodium chlorid and heated for about 40 minutes at a slight dark red heat while the mass is continually stirred and the heated mass be afterward treated for about 8 hours at 50° C. with dilute hydrochloric acid (containing about 5% HCl), 2.22% of copper could be obtained, whereas only 0.12% remained in the residue. In another sample which was broken up more finely and treated in the same manner the residue only contained 0.05% of copper. I found that those surprisingly good results were due to the presence of silica in the ore. By chlorinating the copper in those siliciferous sulfid ores the silicic acid acts in the same way as the sulfuric acid produced by roasting pyrites, inasmuch as it decomposes the alkali chlorids, driving out the chlorin and chlorinating the copper sulfid. That novel application of the dry chlorination process forms an important improvement in the art and especially in the process of working up porphyry ores or similar low grade copper ores containing silica, but little or no iron pyrites, because one can dispense with the very expensive apparatus required for concentrating low grade ores and smelting the copper from the concentrates; moreover the recovery of copper by this new process in place of concentrating and smelting the ore is considerably cheaper. Finally it may be mentioned that owing to the very small amount of copper remaining in the residue which may be considered as a loss, the process allows the profitable working up of copper ores containing even as little as 1% of copper whereas up to the present 1.5% of copper appeared to be the lowest limit for the profitable application of any copper extracting method.

If the ore contains precious metals, the silver goes into solution by lixiviation with hydrochloric acid whence it can be precipitated by methods well known to metallurgists. Gold can be extracted from the residue by chlorin gas or an acidified solution of bleaching powder.

While silver chlorid is not soluble in hydrochloric acid, nevertheless, when the copper chlorid and silver chlorid have completely gone into solution the weak hydrochloric acid acts on the residue for extracting all the cuprous chlorid and copper oxid. The residual liquors remaining after the precipitation of copper with iron and which contain iron chlorids and alkali chlorids are used for dissolving the silver, and despite the presence of chlorids in excess, the silver is dissolved.

I claim:—

The herein described method of extracting copper from porphyry ores and the like containing copper sulfid and silica but little or no pyrites, which method consists in breaking up the ore and mixing the same with approximately ten percentum of alkali chlorids, heating the mass at a temperature not exceeding dark redness, stirring the mass during treatment, treating the mass at approximately 50° C. with dilute hydrochloric acid containing about 5% HCl, and finally precipitating the copper with metallic iron, without roasting the ores preliminary to treatment thereof.

In testimony whereof I have signed my name to this specification in the presence of two subscribing witnesses.

GEORG SCHNEIDER.

Witnesses:
   FRIEDRICH EMIL EMMERICH,
   JOSEF REIFNER.